United States Patent Office 3,322,376
Patented May 30, 1967

1

3,322,376
RETRACTABLE UNDERCARRIAGES FOR AIRCRAFT
Christopher Bernard Neilson, Frodsham, and Jack Perdue, Warrington, England, assignors to Electro-Hydraulics Limited, Warrington, England, a corporation of the United Kingdom
Filed Oct. 5, 1964, Ser. No. 401,534
Claims priority, application Great Britain, Oct. 8, 1963, 39,710/63
7 Claims. (Cl. 244—102)

This invention relation to retractable undercarriages for aircraft and concerns that type of undercarriage in which the landing wheels are rotatably mounted on a bogie frame.

An undercarriage of this type is described in British patent specification No. 635,885 and comprises a subsidiary shock absorber mounted between each bogie and its principal suspension leg of the undercarriage equipment, which subsidiary shock absorber tilts the bogie in such a way that on landing only one wheel or one set of wheels on the bogie engage the ground at the moment of contact, so reducing the drag load on the undercarriage leg.

In the arrangement described in specification No. 635,885, the subsidiary shock absorber, which is known as a bogie hop damper, in addition to its function of tilting the bogie, absorbs a proportion of the landing energy whilst the principal shock absorber in the main leg of the undercarriage absorbs the remainder of the landing energy.

According to the present invention, a retractable undercarriage for an aircraft, having a principal suspension leg including a cylinder and a tube slidable therein, which sliding tube has attached thereto at its lower end a bogie frame with ground-engaging wheels rotatably mounted thereon, comprises a principal shock absorber for absorbing the landing energy, located between the sliding tube and the bogie frame and adapted to tilt the bogie frame so that the landing loads are taken by only one wheel or one set of wheels, and a second shock absorber, located in said principal suspension leg, between the cylinder and sliding tube, which second shock absorber, whilst reacting the taxiing loads when all wheels are in contact with the ground, provides a substantially negligible absorption of the landing energy.

Preferably the principal shock absorber so biases the bogie frame that the rear wheel or rear set of wheels effects initial contact with the ground, on landing.

Preferably, auxiliary means are provided for tilting or biasing the bogie frame so that in the free-in-air position, one wheel or one set of wheels is held lower than the other.

The invention is described with reference to FIGURES 1, 2 and 3 in the accompanying drawing in which.

Figure 1:
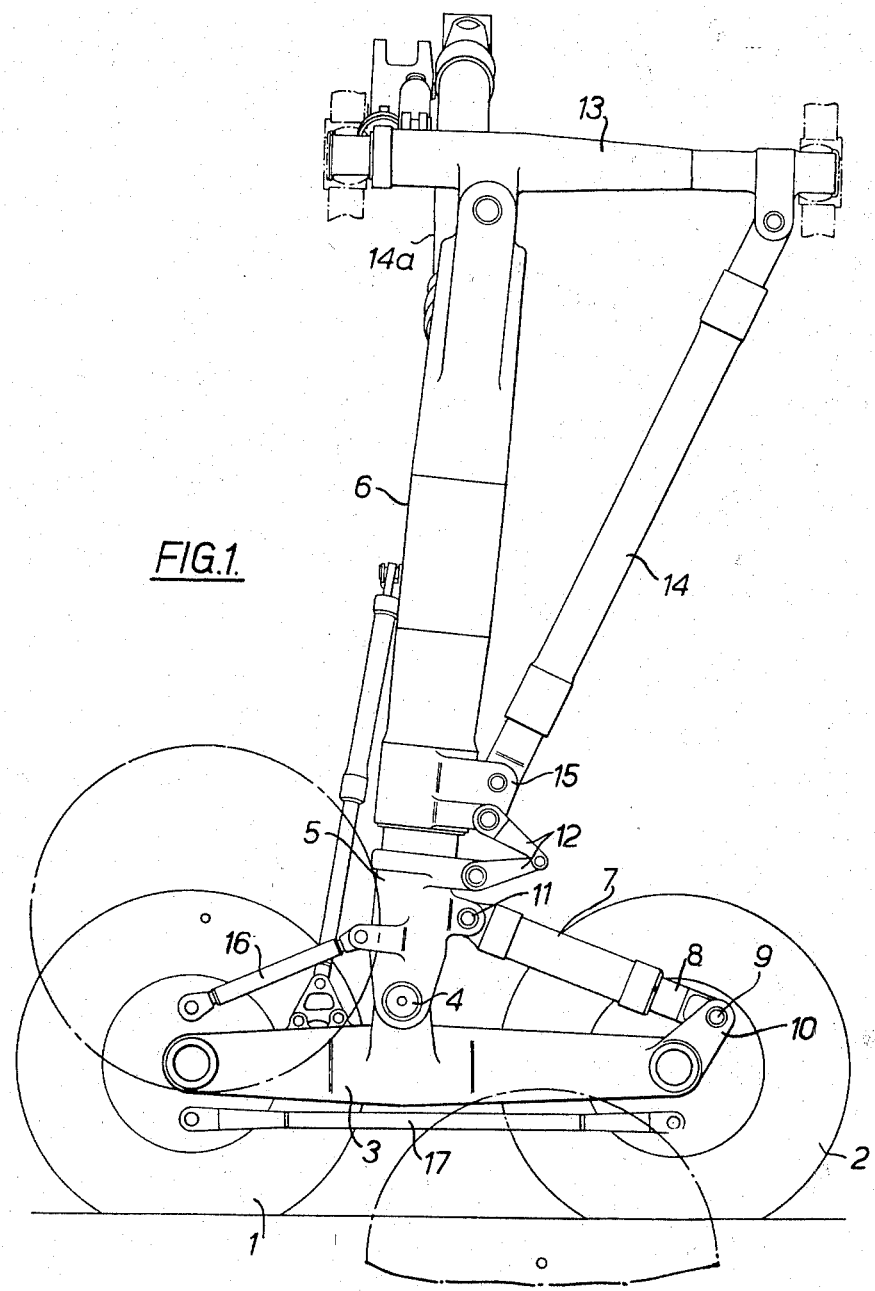
FIGURE 1 illustrates, in side elevation, one form of bogie undercarriage.

Referring to FIGURE 1 a retractable undercarriage comprises four landing wheels arranged in pairs 1 and 2, one behind the other, pivotally mounted at 4 on a sliding tube 5 forming part of a principal suspension leg 6. Located between the bogie frame and its principal suspension leg is a principal shock absorber 7 whose piston rod

2

8 is pivotally connected at 9 to lugs 10 on the bogie frame, the cylinder of the shock absorber 7 being pivotally attached at 11 to the sliding tube 5 above the pivot point 4 on the bogie frame.

The principal suspension leg 6 is of known construction and includes within it a sliding tube 5, torque links 12 being provided to prevent relative rotation between the leg 6 and the tube 5.

Within each suspension leg is a second shock absorber 6a (see FIGURES 2 and 3) of known construction which reacts taxiing load but takes substantially no part in the landing function.

The principal suspension leg is carried, as in known arrangement, by a member 13 mounted in bearings in the aircraft, a drag stay 14 being provided between the member 13 and a lug 15 on the leg 6, a telescopic side stay 14a being also provided between the leg 6 and a fixed point on the aircraft; the undercarriage also includes the normally provided brake torque links 16 and 17.

The principal shock absorber is arranged to bias the bogie frame so that the rear set of wheels effects initial contact with the ground on landing, and is designed so that substantially all the vertical kinetic energy of the aircraft on landing is absorbed by the principal shock absorber 7, the second shock absorber providing a negligible absorption of the landing energy.

Preferably auxiliary means are provided to ensure that the bogie frame is tilted towards the correct landing attitude in the event of failure or partial failure of the spring means (for example air under pressure) in the principal shock absorber. This ensures that on lowering of the undercarriage preparatory to landing of the aircraft, the damping provided in the principal shock absorber is always available for absorption of vertical kinetic energy even though the spring means in the principal shock absorber may be ineffective.

Figure 2:
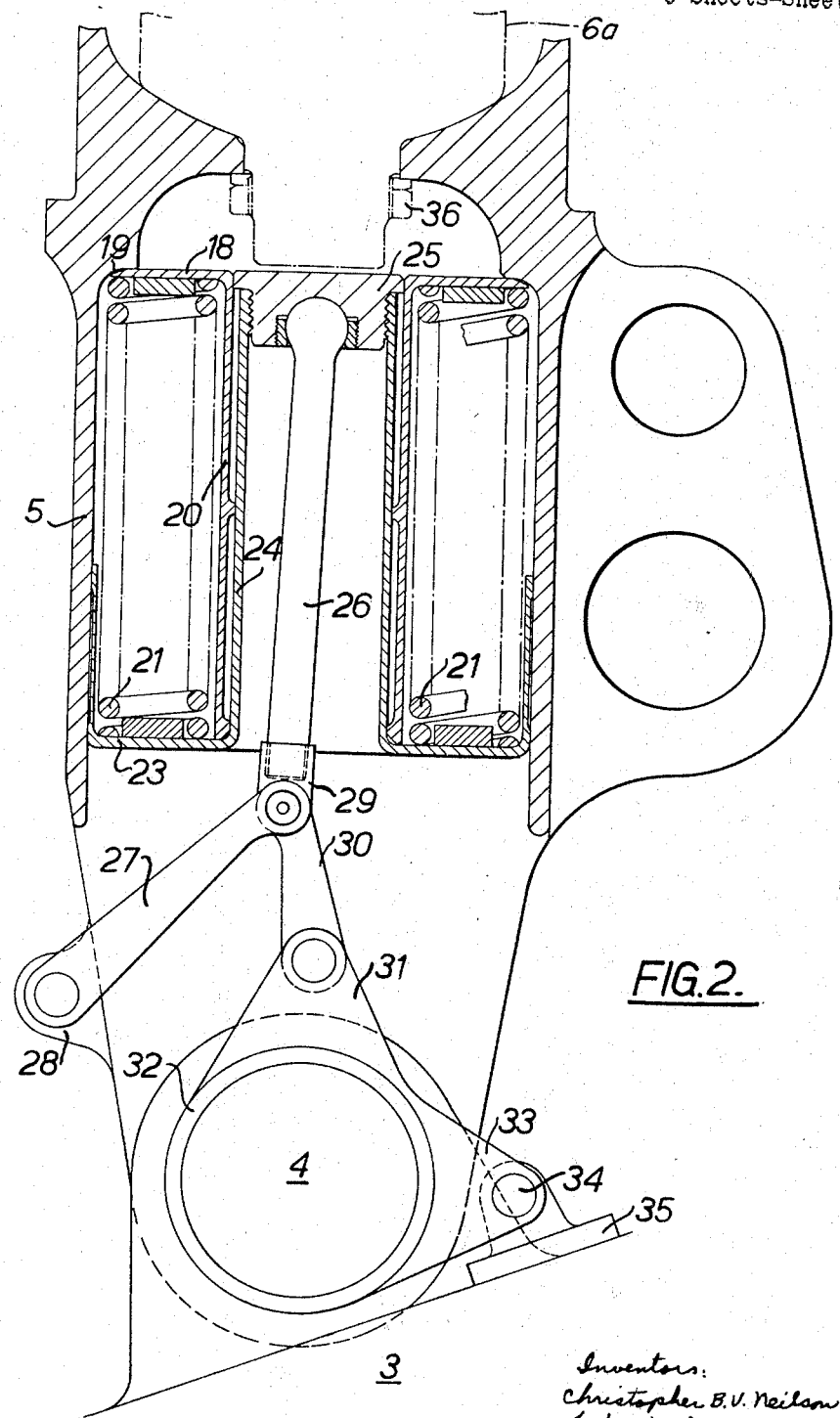
FIGURE 2 illustrates an embodiment of auxiliary means for tilting or biasing the bogie.

Such an auxiliary means is shown in FIGURE 2 in which there is provided an annular member 18 within the sliding tube 5 and in abutting relationship therewith as shown at 19. The annular member 18 is provided with a depending guide portion 20. A number of springs 21 are arranged between the annular member 18 and a further annular member 23, which latter has a portion 24 slidable within the guide portion 20. A cap 25 is secured in the top of the portion 24 and has one end of a link 26 universally mounted therein.

A link 27 is pivotally connected between the lug 28 on the sliding tube 5 and the lower end 29 of the link 26. A further link 30 is pivotally connected between the said end 29 and a lug 31 on a sleeve 32, which is rotatably mounted on the pivot 4. The sleeve 32 has a further lug 33 to which is pivotally connected at 34 a bracket 35 secured to the bogie frame 3.

In FIGURE 2 the bogie frame is depicted in its extreme position when the principal shock absorber (not shown) is fully closed and the springs 21 are fully compressed. The second shock absorber 6a is secured at 36 in the sliding tube 5.

When the undercarriage is lowered in the free-in-air position, the springs 21 extend forcing the annular member 23 and the link 26 downwardly. This downward movement of the link 26 causes clockwise rotation of the sleeve 32 through the links 27 and 30, thereby causing a similar rotation of the bogie frame 3 towards or to the correct landing attitude.

Figure 3:
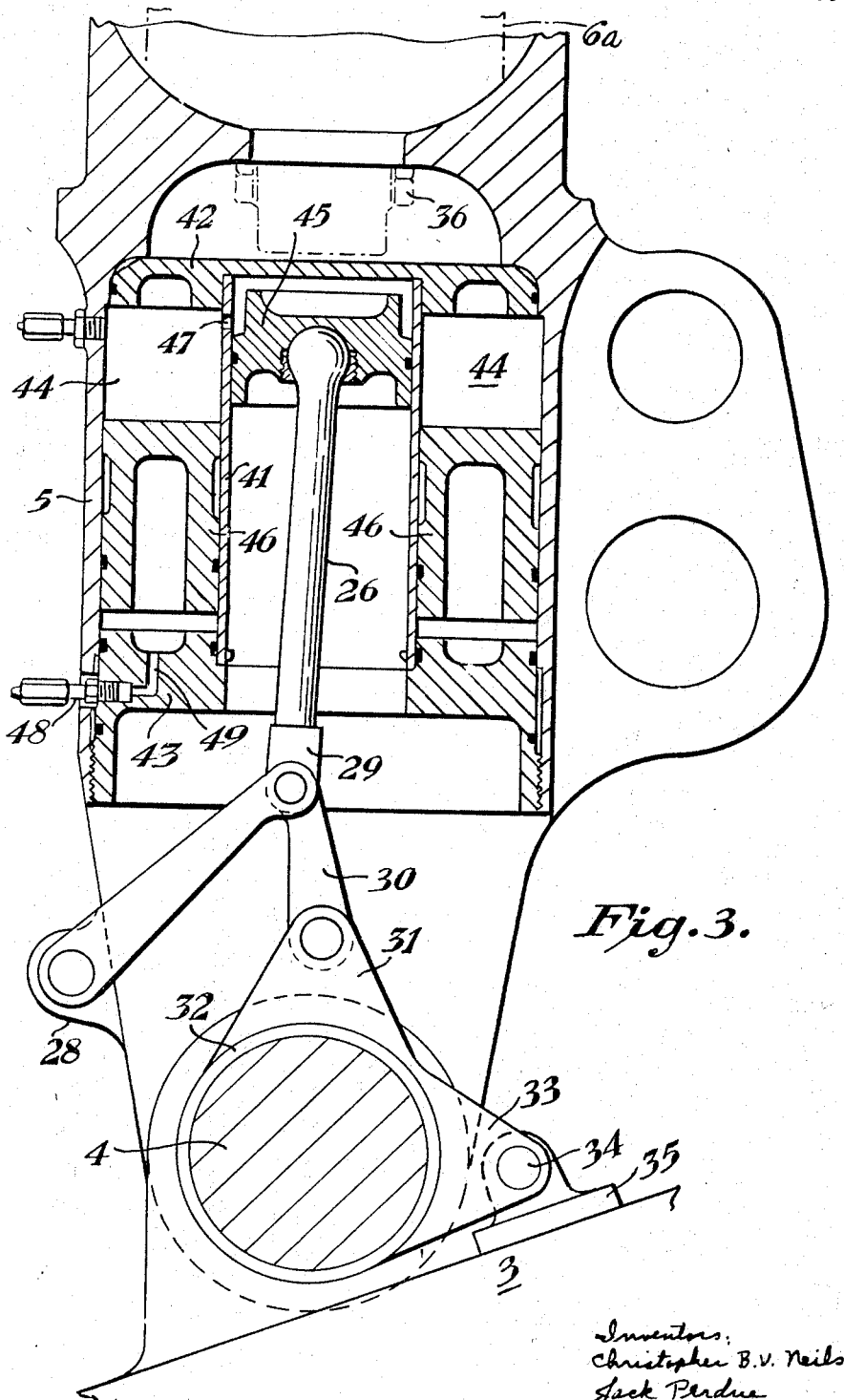
FIGURE 3 illustrates an alternative embodiment of the auxiliary means.

In FIGURE 3, which illustrates an alternative arrangement to that depicted in FIGURE 2, parts common to both arrangements are denoted by the same reference numerals.

A cylinder 41 is provided within the sliding tube 5 and is located coaxial therewith and spaced therefrom by means of an upper end cap 42 and a lower end locating member 43, which together with the tube 5 and cylinder 41, define an annular chamber 44 surrounding and concentric with cylinder 41. A piston 45 is slidable within the cylinder 41 and has one end of the link 26 universally mounted therein.

Within the annular chamber 44 is fitted a hollow annular piston 46. The space within the chamber 44 and cylinder 41 above the pistons 46 and 45 is filled with oil and a passage 47 is formed in the cylinder 41 adjacent the upper end of the chamber 44 to allow the oil to pass to and from the top of cylinder 41 to the top of chamber 44.

An external connection 48 is attached to the member 43, connecting through a passage 49 with the underside of the piston 46, through which connection an air charge may be supplied to form an annular cushion of compressed air or gas beneath the piston 46.

In the free-in-air attitude the air or gas under pressure beneath the annular piston 46 forces the latter upwardly expelling oil into the top of the cylinder 41 thus forcing the piston 45 downwardly. When the aircraft is landed, the bogie frame tilts and the piston 45 rises within the cylinder 41 expelling the oil back into the chamber 44 and thus re-compressing the air or gas contained beneath the piston 46.

It will be understood that further alternative auxiliary means may be provided to tilt or bias the bogie frame towards the correct landing attitude for example a rotary motor, operated by fluid pressure.

What is claimed is:

1. A retractable undercarriage for an aircraft, said undercarriage comprising a principal suspension leg including a cylinder and a tube slidable therein, a bogie frame pivotally attached to the slidable tube at the lower end thereof, at least one pair of ground-engaging wheels rotatably mounted on the bogie frame, a principal shock absorber for absorbing substantially all the vertical kinetic energy on landing located between the sliding tube and the bogie frame and adapted to tilt the bogie frame so that the landing loads are taken by one only of said pair of wheels, and auxiliary means acting between said bogie frame and said slidable tube for tilting the bogie frame, so that in the free-in-air position one wheel is lower than the other.

2. A retractable undercarriage for an aircraft, said undercarriage comprising a principal suspension leg including a cylinder and a tube slidable therein, a bogie frame pivotally attached to the slidable tube at the lower end thereof, a pair of ground-engaging wheels rotatably mounted on the bogie frame, a principal shock absorber for absorbing substantially all the vertical kinetic energy on landing located between the slidable tube and the bogie frame and adapted to tilt the bogie frame so that the landing loads are taken by one only of said pair of wheels, a second shock absorber located in the suspension leg and between said cylinder and said slidable tube, which second shock absorber whilst reacting the taxiing loads when both the said wheels are in contact with the ground provides a substantially negligible absorption of the landing energy, and auxiliary means for tilting the bogie frame so that in the free-in-air position one wheel is lower than the other, said auxiliary means comprising a pair of relatively slidable annular members mounted within the principal suspension leg, spring means biassing the members apart and linkage connecting one of said members to the bogie frame.

3. A retractable undercarriage for an aircraft, said undercarriage comprising a principal suspension leg including a cylinder and a tube slidable therein, a bogie frame pivotally attached to the slidable tube at the lower end thereof, at least one pair of ground-engaging wheels rotatably mounted on the bogie frame, a principal shock absorber for absorbing substantially all the vertical kinetic energy on landing located between the sliding tube and the bogie frame and adapted to tilt the bogie frame so that the landing loads are taken by one only of said pair of wheels, a second shock absorber located in the suspension leg and between said cylinder and said slidable tube which second shock absorber whilst reacting the taxiing loads when both said wheels are in contact with the ground, provides a substantially negligible absorption of the landing energy, and auxiliary means for tilting the bogie frame so that in the free-in-air position one wheel is lower than the other, said auxiliary means comprising a first cylinder having a piston slidable therein and connected through linkage to the bogie frame, a second cylinder concentric with the first cylinder and containing an annular piston, means to permit the passage of liquid between the cylinders above the pistons and means for admitting gas under pressure beneath the annular piston, the cylinders being disposed within the principal suspension leg.

4. A retractable undercarriage for an aircraft, said undercarriage comprising a principal suspension leg including a cylinder and a tube slidable therein, a bogie frame pivotally attached to the slidable tube at the lower end thereof, sets of ground-engaging wheels rotatably mounted on said bogie frame, a principal shock absorber for absorbing substantially all the vertical kinetic energy on landing located between the slidable tube and the bogie frame so that the landing loads are taken by only one set of wheels, and auxiliary means acting between said slidable tube and said bogie frame for tilting the bogie frame so that in the free-in-air position one set of wheels is lower than the other wheels.

5. A retractable undercarriage for an aircraft, said undercarriage comprising a principal suspension leg including a cylinder and a tube slidable therein, a bogie frame pivotally attached to the slidable tube at the lower end thereof, sets of ground-engaging wheels rotatably mounted on the bogie frame, a principal shock absorber for absorbing substantially all the vertical kinetic energy on landing located between the slidable tube and the bogie frame and adapted to tilt the bogie frame so that the landing loads are taken by only one set of wheels, a second shock absorber located in said suspension leg and between said cylinder and said slidable tube which second shock absorber whilst reacting the taxiing loads when all the wheels are in contact with the ground provides a substantially negligible absorption of the landing energy, and auxiliary means for tilting the bogie frame so that in the free-in-air position one set of wheels is lower than the other wheels, said auxiliary means comprising a first cylinder having a piston slidable therein and connected through linkage to the bogie frame, a second cylinder concentric with the first cylinder and containing an annular piston means to permit the passage of liquid between the cylinders above the pistons and means for permitting the passage of liquid between the cylinders above the pistons and means for admitting gas under pressure beneath the annular piston, the cylinders being disposed within the principal suspension leg.

6. A retractable undercarriage for an aircraft, said undercarriage comprising a principal suspension leg including a cylinder and a tube slidable therein, a bogie frame pivotally attached to the slidable tube at the lower end thereof, sets of ground-engaging wheels rotatably mounted on the bogie frame, a principal shock absorber for absorbing substantially all the vertical kinetic energy on landing located between the slidable tube and the bogie frame and adapted to tilt the bogie frame so that the landing loads are taken by only one set of wheels, a second shock absorber located in said suspension leg and between said cylinder and said slidable tube which second shock absorber whilst reacting the taxiing loads when all of the wheels are in contact with the ground provides a substantially negligible absorption of the landing energy, and auxiliary means for tilting the bogie frame so that in the free-in-air position one set of wheels is lower than the other wheels, said auxiliary means comprising a pair of relatively slidable annular members mounted within the principal suspension leg, spring means biassing the members apart and linkage connecting one of the members to the bogie frame.

7. An aircraft undercarriage construction comprising a suspension leg; a bogie frame pivotally attached to said leg; means on said bogie frame for journaling wheels thereon fore and aft of said frame; shock absorber means interconnecting said leg and said bogie frame for normally biasing said frame to a tilted position in which landing loads are taken by one of said wheels and for absorbing vertical kinetic energy on landing; and auxiliary means reacting between said leg and said bogie frame for biasing said frame to said tilted position.

References Cited

UNITED STATES PATENTS

| | | | |
|---|---|---|---|
| 2,732,152 | 1/1956 | Neilson et al. | 244—104 |
| 2,896,884 | 7/1959 | Perdue | 244—102 |
| 3,041,020 | 6/1962 | Willitt | 244—102 |

FOREIGN PATENTS

| | | |
|---|---|---|
| 670,889 | 4/1952 | Great Britain. |
| 707,791 | 4/1954 | Great Britain. |
| 820,217 | 9/1959 | Great Britain. |

MILTON BUCHLER, *Primary Examiner.*

FERGUS S. MIDDLETON, *Examiner.*

L. C. HALL, P. E. SAUBERER, *Assistant Examiners.*